Feb. 16, 1960   F. A. WODAL ET AL   2,925,234
AIRCRAFT REMOTE PROPORTIONAL CONTROL MECHANISM
Original Filed Sept. 16, 1948   4 Sheets-Sheet 2
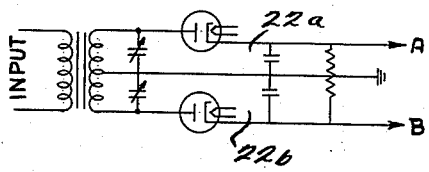
_Fig. 3._
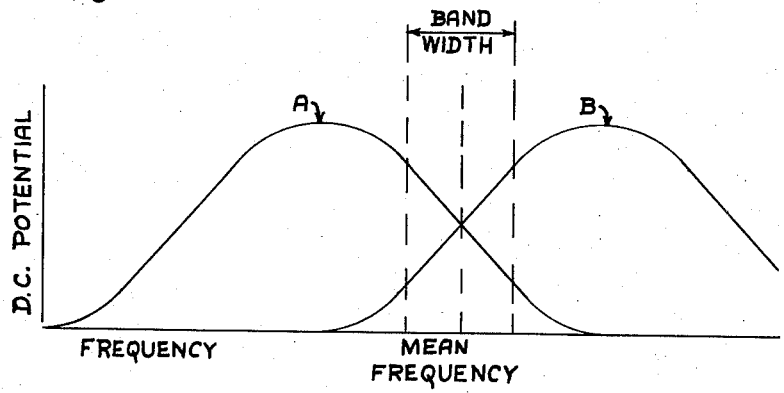
_Fig. 4._
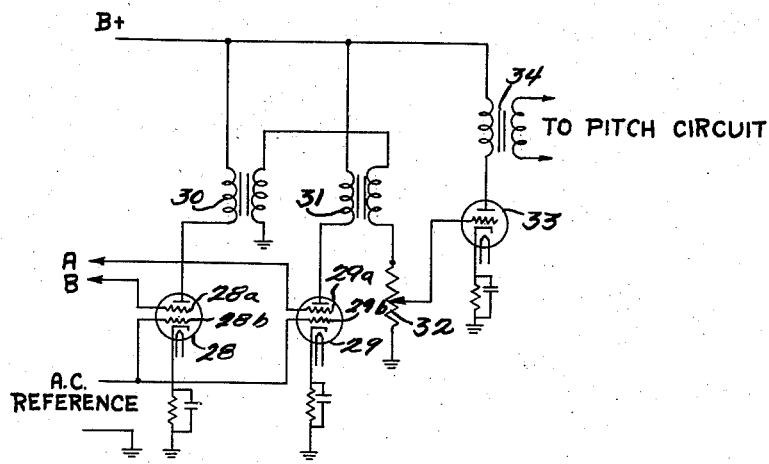
_Fig. 5._
INVENTOR.
FRANCIS A. WODAL
BY ROBERT B. EAVES
Semmes, Keegin, Robinson +Semmes
ATTORNEYS

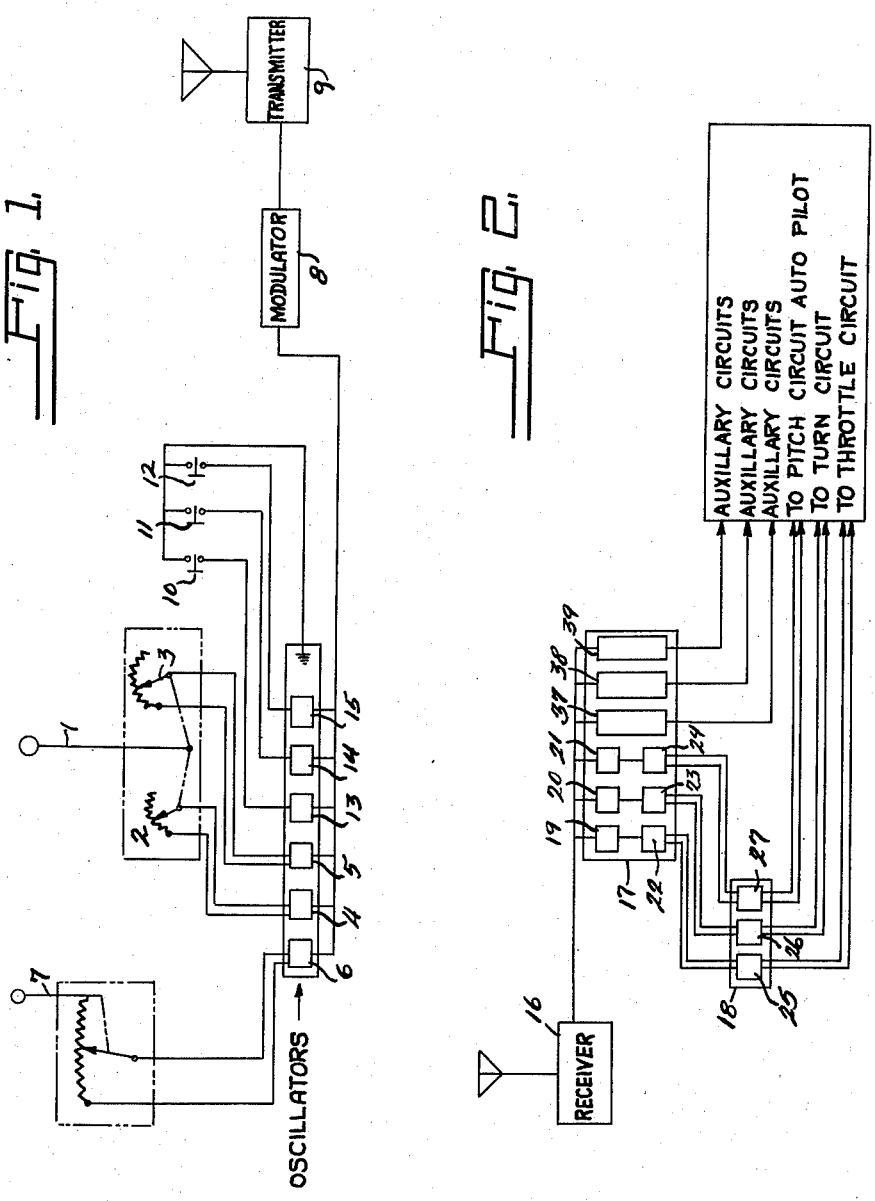

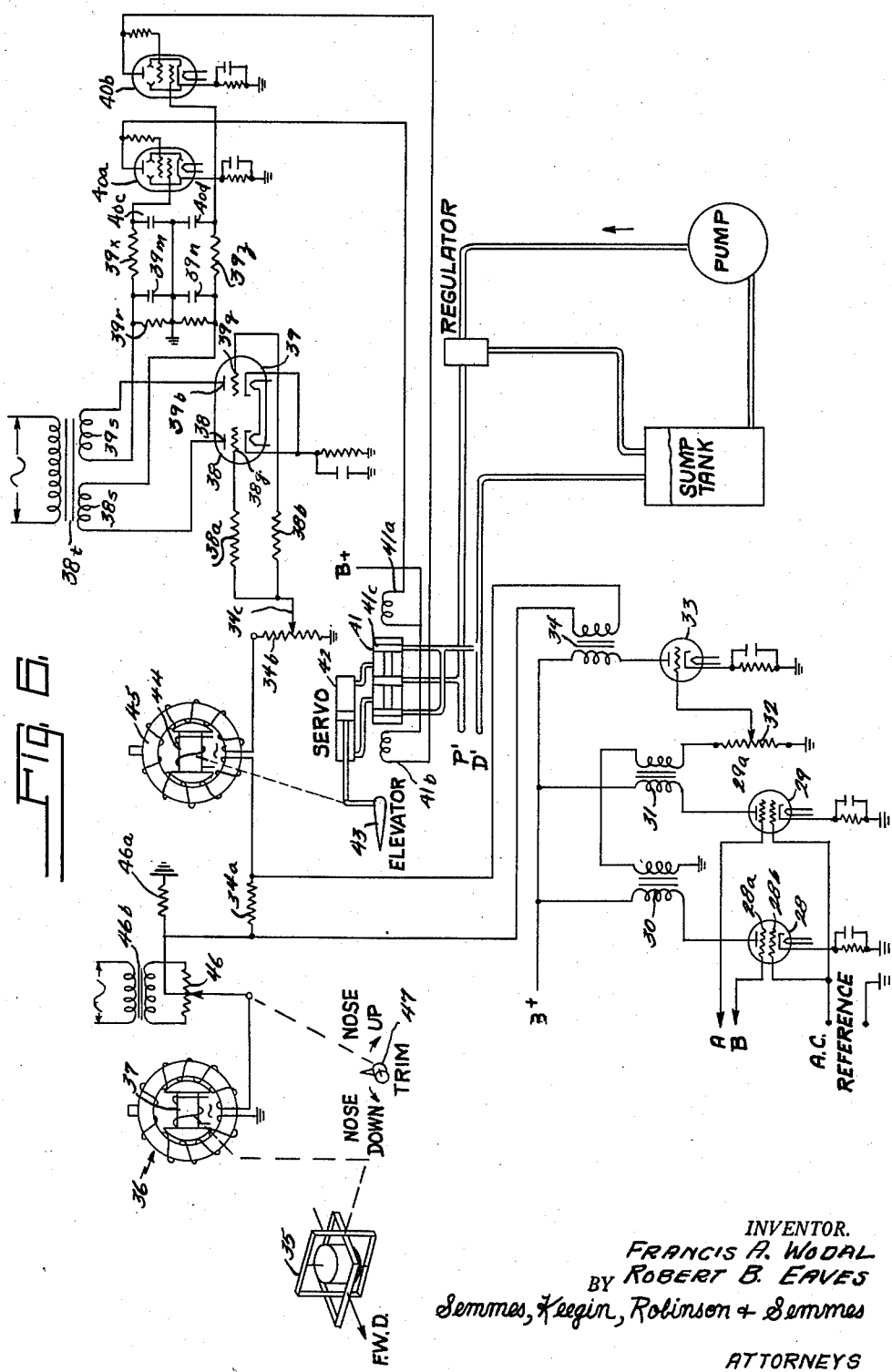

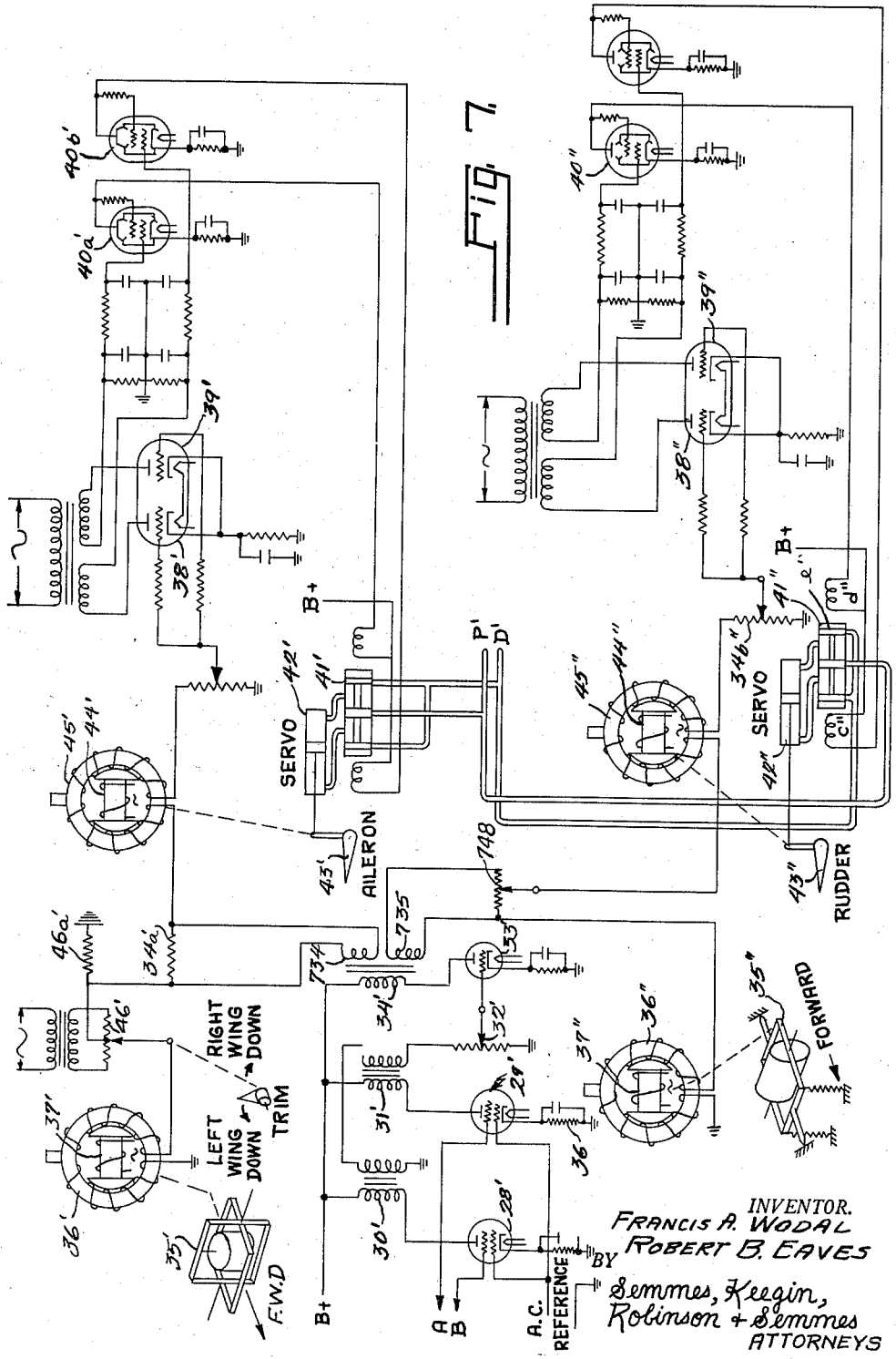

United States Patent Office 2,925,234
Patented Feb. 16, 1960

2,925,234
AIRCRAFT REMOTE PROPORTIONAL CONTROL MECHANISM

Francis A. Wodal, Haddonfield, N.J., and Robert B. Eaves, Kretlow, Pa., assignors, by mesne assignments, to Earle W. Wallick, Silver Spring, and Temple N. Joyce, Arnold Post Office, Md.

Refiled for abandoned application Serial No. 49,592, September 16, 1948. This application January 5, 1956, Serial No. 557,593

4 Claims. (Cl. 244—77)

The present invention relates to apparatus for controlling moving vehicles and more particularly to a system through which the control of a gyroscope stabilized mobile craft is enabled from a remote station. The present application is a substitute for abandoned application Serial No. 49,592, filed September 16, 1948.

The principles of the invention relates to or may be used in the control of land vehicles such as automobiles, tanks, trucks, mine detonators and detectors and the like, as well as water craft and torpedoes, and also airplanes, rotary winged aircraft, missiles, bombs and gliders. However, for purposes of clarity and conciseness, the descriptions and illustrations of the invention hereinafter set forth will deal with the application of the invention to aircraft control.

It is an object of the present invention to provide novel means for the remote control of aircraft, other craft or vehicles, whereby the attitude and heading of the craft may be controlled by an operator or device located at a remote point either on the ground or aboard another craft.

Another object of the invention is to provide means whereby a controlled craft will assume an attitude or heading in response to the actuation of suitable remote control elements, the controlled craft changing its attitude or heading proportionally in angular values and substantially at the same rate of movement as any change affected in the remote control elements.

Another object is to provide a control lever and associated apparatus so that the position of the control lever will be indicative of the attitude of a craft, and so provide for the operator an "attitude sense" of the operating conditions existing at the controlled craft.

Another object is to provide a vertical control lever and associated apparatus so that fore and aft movement of the control lever will result in a proportional angular displacement, both as to position and rate, along the pitch axis of the controlled craft.

Another object is to provide a control lever and associated apparatus for use in the remote control of craft movement such as aircraft flight, so that movement of the control lever to the left or right will cause a proportional banking movement, both as to position and rate of the controlled craft, and that in so doing the values of aileron, rudder and elevator movements that result from such a change will be coordinated and so proportioned as to provide a "ball-center" turn.

Another object is to provide a remote control system that will supplement the inherent stability of the controlled craft obtained by means of a gyro stabilization system or similar system commonly known commercially as an automatic pilot, by means of proportional control signals which emanate from the control source and are received in the controlled craft for conversion into suitable signals changing the control reference of the automatic pilot, resulting in the controlled craft assuming an attitude or heading in accordance with the signals received from said control source.

Another object is to provide a control element wherein movement of said control element will effect a corresponding movement, both in regard to angular displacement and rate of displacement of the controlled craft.

Numerous means have been developed heretofore to transmit proportional signals to a remotely located receiving station, and it is not intended that the invention be limited in scope to use of the variable frequency transmission system described hereinafter. The following methods are set forth as further examples of the various possible transmission principles that may be employed for this purpose.

A. Manipulation of the controlling lever may operate to effect changes in the amplitude of a subcarrier of the transmitted wave, so that the amplitude is indicative of the control lever position. At the receiver a signal may be applied to the stabilization system proportional to the amplitude, so that the attitude of the airplane corresponds with the attitude of the controlling lever of the transmitting station.

B. Manipulation of the controlling lever may operate to cause a variation in the time relationship between alternate pulses, so that the duration of each pulse is indicative of the control lever position. At the receiving station, the received pulses may be converted into voltage or current signals and applied to the stabilization system so that the attitude of the airplane corresponds with the attitude of the controlling lever.

C. Manipulation of the controlling lever may operate to cause change in the phase of a transmitted wave, when referenced to a standard transmitted wave, so that the phase displacement is indicative of the control lever position. At the receiving station the phase shift may be converted into voltage or current signals and applied to the stabilization system, so that the attitude of the airplane corresponds with the attitude of the controlling lever.

It is also to be understood that the radio transmission of signals may be replaced by applying any of the above-enumerated methods to light or sonic signals, and that these last means of signal transmission may be more suitable for certain military applications, for example, the application of the principles of the invention to underwater craft.

The gyro stabilized proportional control system of the invention may be defined as a means of introducing signals to a gyro stabilized craft control system, proportional to the displacement of a remote control element. With its proportional positioning and variable rate of application, this control system facilitates rapid attitude and throttle changes which are essential to the accomplishment of smooth aircraft landings.

The signals from the remote control station are imposed directly upon the gyroscope pick-offs demanding a response from the follow-ups which react immediately to accomplish the ordered change. Since the signal input is directly proportional to the rate of movement of the controls at the remote station, it follows that the gyroscopic ordered reactions will be of equivalent magnitude. The action of the automatic pilot is not impaired, however, by the introduction therein of signals from the remote station and atomspheric disturbances as sensed by the pick-up which unbalance the system will occasion a further reaction from the follow-ups. These added signals will be induced algebraically upon the transmitted signals thus insuring maintenance of stabilized flight at all times.

The control lever position is indicative of the aircraft's attitude as it may be termed parallel to the Z axis of the aircraft at all times.

Referring to the drawings briefly:

Figure 1 is a schematic diagram of the transmitting apparatus employed for transmitting signals to a remotely controlled object;

Figure 2 is a schematic diagram of the receiving apparatus employed for receiving control signals at the remotely controlled object;

Figure 3 is a circuit diagram of one of the discriminator circuits of the receiving apparatus;

Figure 4 is a graph illustrating the output frequency characteristic of the discriminator shown in Figure 3;

Figure 5 is a circuit diagram of one of the proportional converters of the receiving apparatus;

Figure 6 is a circuit diagram illustrating the connection of the proportional converter output to an automatic pilot for aircraft elevator remote control; and Figure 7 is a circuit diagram illustrating the connection of the proportional converter output to an automatic pilot for aircraft rudder and aileron remote control.

Referring to Figure 1, a control lever 1 is mechanically linked to two potentiometers 2 and 3, each controlling the frequency of an oscillator 4 and 5, respectively. Fore and aft movements of the control lever 1 change the oscillator 4 about its mean frequency, to effect control of pitch of the airplane. Side motion, left and right, of the control lever 1 controls the oscillator 5 about a different frequency to effect turns. Control of a third oscillator 6 by a throttle lever 7 effects changes in throttle positions.

The oscillator frequencies controlled by control lever position are of such frequencies that no intermodulation will occur. The oscillator frequencies are amplified in a mixing amplifier 8 and transmitted over a radio frequency carrier wave by a transmitter 9. Switches 10, 11 and 12 key fixed frequency oscillators 13, 14 and 15, respectively, and may be used to operate auxiliary functions in the controlled aircraft, such as landing gear up and down, flaps up and down, etc.

The oscillators 4, 5, 6, 13, 14, and 15 may be of any conventional design well known in the art, capable of generating audio or radio frequency electrical oscillations of different frequencies, the frequencies of which may be varied by the potentiometers controlled by the levers 1 and 7. It is, of course, obvious that these frequencies may be varied by means other than variable resistors as, for example, variable capacitors or variable inductors and in the case of variable inductors, these may be supplied with magnetic cores that may be moved or displaced by the levers 1 and 7 in order to vary the inductance of the variable inductor.

Referring now to Figure 2, a receiver 16 positioned in the aircraft or other mobile device to be controlled, picks up the radio frequency carrier emitted by the transmitter 9 and demodulates it to the original frequencies generated by the oscillators of Figure 1. Currents corresponding to these frequencies are then fed through a filter and discriminator unit 17. From the discriminator unit 17 the voltages corresponding to the oscillator frequencies are applied to a proportional converter 18, which converts the voltages into signals that are applied to the desired circuits of the automatic pilot as will be described hereinafter more fully.

It will be observed that changes in the position of the control levers 1 and 7, Figure 1, are translated into frequency changes of channels that are, preferably audio frequency channels although radio frequency channels may be employed if desired. These frequencies are sent over the radio link, that is, modulated on to the carrier wave emitted by the transmitter 9, and are received by the receiving apparatus 16, the output of which is connected to filters 19, 20 and 21. The filters are standard band pass filters turned to their respective channels and pass only those frequencies to which they are turned so that they separate the frequencies corresponding to the aforesaid oscillators. These signals are then fed to the discriminators 22, 23 and 24, respectively. Additional band pass filters 37, 38 and 39 are provided for the discriminator unit 17 connected to the receiving device 16, being designed to pass narrow frequency bands corresponding to the frequencies of the oscillators 13, 14 and 15, respectively, for the purpose of separating the signals from those oscillators and applying these signals for the control of operation of the landing gear, flaps, etc. of the controlled craft.

Figure 3 shows a typical discriminator circuit of standard frequency modulation type consisting of two diode circuits 22a and 22b, one tuned above the mean frequency of the oscillator, for example oscillator 4, by an amount greater than the deviation of the signal, and the other tuned below the mean frequency by the same amount. Figure 4 illustrates the output frequency characteristic of this circuit wherein A is the frequency characteristic of one diode circuit, for example diode circuit 22a, and B is that of the other circuit 22b. The curves indicate the D.C. voltages developed across each circuit as the frequency of the signal input is varied. The D.C. voltage developed in the output circuits of the discriminators 22, 23 and 24 are fed into the proportional converters 25, 26 and 27 respectively, Figure 2, where they are converted into signals that are usable in the automatic pilot.

Figure 5 shows one form of a proportional converter, wherein the D.C. voltage A (Figure 3) is fed to a grid 29a of the tube 29, and the D.C. voltage B (Figure 3) is fed to a grid 28a of the tube 28. A reference A.C. voltage from the automatic pilot is impressed upon the grid 28b and 29b in tubes 28 and 29, respectively, so that the plate current in each tube circuit will be pulsating D.C., the amplitude of the A.C. component of which will be in proportion to the instantaneous D.C. voltages being fed into the tubes by the discriminator. The secondaries of transformers 30 and 31 are connected in series so that the voltage induced in one is opposed by the voltage induced in the other. The resultant A.C. voltage output will be zero if both voltages from the discriminator are equal, but will vary in phase and amplitude as the frequency applied to the discriminator circuit is changed. This A.C. voltage from transformers 30 and 31 is fed through the windings of potentiometer 32 to ground, the slider of which is connected to the grid of the amplifying tube 33 and may be used as a means for calibrating the converter. The output of this tube 33 is fed into the automatic pilot signal circuit through transformer 34, having a resistor 34a connected across the secondary.

Figure 6 illustrates the application of this invention to a typical automatic pilot. The attitude reference to operate the automatic pilot is derived from the vertical axis gyro 35 by the electrical pick-off device 36. When the attitude of the airplane changes in pitch for any reason, such as a gust disturbance, the winding 36, which is attached to the airplane is displaced relative to the electrical rotor 37, which is attached to gimbals of the gyro. A voltage, the value of which is proportional to the angular magnitude of the displacement, and the phase of which is determined by the direction, appears across the output of winding 36. This voltage is applied to the potentiometer 46 connected across the secondary of transformer 46b. The center of potentiometer 46 is connected to one end of the resistor 46a and this latter resistor is connected across resistor 34a, a winding 45 and potentiometer 34b. The variable contactor 34c of the potentiometer 34b is connected to the resistors 38a and 38b and through these resistors to the grids 38g and 39g of the triodes 38 and 39 respectively. These triodes are sections of a duo-triode vacuum tube and the plates or anodes 38p and 39p of these triodes are connected to one terminal of each of the secondary windings 38s and 39s, respectively of the transformer 38t. A reference A.C. voltage is applied to the plates 38p and 39p from the secondaries 38s and 39s, respectively, so that the signal applied to grids 38g and 39g will be in phase with the A.C. potential applied to one plate only. If the aforesaid gust disturbance causes a nose-down condition, the signal will be in phase with plate 38p, and if it causes a nose-up condition, the signal will be in phase with plate 39p.

The other terminals of the secondaries 38s and 39s are connected to the ends of the resistor 39r and the center of this resistor is returned to the cathode circuit of the beam type amplifiers 40a and 40b. The common terminals of the capacitors 39m and 39n and the capacitors 40c and 40d are connected to the center of the resistor 39r. Resistor 39x is connected between the capacitors 39m and 40c and between the secondary 39s and the control grid of beam type amplifier 40a. Similarly resistor 39z is connected between capacitors 39n and 40d and between secondary 38s and control grid of the beam type amplifier 40b. The plate of tube 40a is connected to the solenoid 41a of the transfer valve 41 and the plate of amplifier tube 40b is connected to the solenoid 41b, the common terminals of these solenoids 41a and 41b being connected together to the positive terminal of the anode current supply for these amplifier tubes 40a and 40b.

The amplifier tubes 40a and 40b operate the transfer valve 41 containing the two solenoids 41a and 41b so that if the disturbance causes a nose-down condition, the current in solenoid 41b will be greater than the current in solenoid 41a; and if the disturbance causes a nose-up condition, the current in solenoid 41a will be greater than the curernt in solenoid 41b. The valve stem 41c is positioned by the difference in current in solenoids 41b and 41a. This valve controls the direction of flow of oil into the servo 42, so that the direction of the servo movement will depend on the direction of the disturbance. As the servo 42, linked to the elevator surface 43, moves the elevator 43 to correct for the disturbance, it also moves the rotor 44 of the pick-off device 45, termed the "follow-up," causing a voltage output similar to that of pick-off device 36 but of opposite phase. When the servo 42 has moved the rotor 44 until the output voltage of the winding 45 is of the same magnitude as the output of the winding 36, the currents in the solenoids 41b and 41a are equal and the servo 42 is stopped. As the airplane returns to level flight as a result of the displaced elevator 43, the signal output of the pick-off device 36 diminishes, the servo 42 returns to its original position, and the signal output of the pick-off device 45 diminishes.

The system just described will operate the elevator 43 to maintain level attitude during normal flying conditions. An A.C. reference voltage is applied across the potentiometer 46 by the transfermor 46b so that the pilot by manipulating the knob 47 may introduce to the signal circuit including the resistor 46a a fixed electrical signal to accomplish a fine adjustment in the attitude of the airplane. Such signals superimposed on the stabilization circuit are known as trim signals. The converter circuit of Figure 5 is included in Figure 6 to illustrate the means for introducing the proportional signals to the automatic pilot. It was shown in the discussion of Figure 5 that the voltage of the secondary of the transformer 34 is proportional in magnitude to the displacement of the control element 1 at the transmitter 9, while its phase is determined by the direction of displacement of the control element 1. In Figure 6 the transformer 34 is in series with the automatic pilot signal circuit consisting of pick-off device 36, the trim potentiometer 46, the follow-up device 45, and the potentiometer 34b, so that the signal appearing on 34 causes the operation of the automatic pilot amplifier 40a—40b, valve 41, the servo 42, and the elevator surface 43, just as a signal arising from a disturbance. By this arrangement it is obvious that the remotely located operator may introduce trim signals to the automatic pilot just as an airborne operator could introduce trim signals by manipulating the knob 47. Since the signals are introduced directly into the signal channel of the control amplifier of the gyrostabilized system, the response to the control lever displacement is practically instantaneous. This type of system, being gyrostabilized, presents the operator with a set of controls to which he is accustomed, without burdening him with the responsibility of stabilizing the airplane.

Figure 7 illustrates the application of this proportional control system having parts corresponding to those illustrated in Figure 6, to the aileron and rudder controls of an automatic pilot. The aileron control consists of the pick-off device 36', mounted on the vertical axis gyro 35 in such a manner that it is sensitive to displacement in the roll axis, and components corresponding to those described under Figure 6, which are the trim potentiometer 46', phase sensitive circuit of triodes 38' and 39', amplifiers 40a' and 40b', transfer valve 41', servo 42', aileron 43', and the follow-up device 45'. This system operates in a manner similar to that described for the pitch control, to maintain lateral stability while the aircraft is in flight.

In the apparatus shown in Figure 7, the transformer 34' connected to the plate of amplifier tube 33' is provided with two secondary windings 734 and 735, instead of one winding as shown in Figure 6, the winding 734 being connected across the resistor 34a', the same as in Figure 6, and the winding 735 being connected across the potentiometer 748. The variable portion of the potentiometer 748 is connected in series with the winding 36", the winding of the follow-up device 45" and the potentiometer 34b", the variable contactor of the potentiometer 34b" being connected to the grids of the triodes 38" and 39" through suitable resistors.

The rudder control of the automatic pilot consists of the pick-off device 36" mounted on a rate of turn gyro 35" so that it is sensitive to the rate of change about the yaw axis.

Electrical potentials from the winding 36", the potentiometer 748, winding 45" are applied across the potentiometer 34b" since these elements are connected in series across this potentiometer, and signals from this potentiometer are applied to the phase sensitive triodes 39"—39" through resistors. The plates of these triodes are energized from a pair of secondaries of a transformer the same as triodes 38—39 of Figure 6. The outputs of the triodes 38"—39" are connected to the control grids of the beam type amplifier tubes 40a"—40b" corresponding to tubes 40a—40b of Figure 6, and the outputs of these beam type amplifier tubes energize solenoids 41a"—41b" to control the valve 41" and the servo 42". This system operates in a manner similar to that described for the pitch control to maintain directional stability of the aircraft in flight. The converter circuit described in Figure 5 is shown on Figure 7 as it is applied to cause coordinated turns of the aircraft proportional to control element displacement. This application differs from that described for the pitch control in that the output signal appearing across transformer 34' is applied to both aileron and rudder circuits through the use of two secondaries 734 and 735 as described. It is obvious, from the foregoing description, that a lateral displacement of the control element will result in the application of trim signals to the aileron and rudder circuits. In the aileron circuit the trim applied will cause the airplane to bank to the right or left in proportion to the control element displacement. The signal applied to the rudder circuit will cause rudder movement until the airplane is turning at a rate proportional to the aileron trim. The potentiometer 748 is provided to permit adjustment of the proportion of the signal to be applied to the rudder circuit so as to result in a coordinated "ball center" turn.

While this invention has been set forth in detail with respect to a particular embodiment thereof it is not desired to limit it to the exact details described except in scope as they are defined by the following claims.

What we claim is:

1. A control system comprising a mobile body carrying a gyrostabilizer, a control circuit including a progressively variable element connected to said gyrostabilizer, an attitude varying mechanism controlled by said circuit, a signal receiver connected to said circuit for superimposing remote signals thereon; a signal transmitter remote from said body, a progressively variable control device connected to said transmitter for modifying signals produced by said transmitter as a function of the magnitude of displacement of said control device from a neutral position whereby attitude changes of the mobile body are controlled in proportion to the magnitude of displacement of said control device from its neutral position; and circuit means provided by said signal receiver for excluding remote signals from said control circuit when said control device assumes its neutral position.

2. A control system comprising a mobile body carrying a gyrostabilizer, a control circuit including a progressively variable element connected to said gyrostabilizer, an attitude varying mechanism controlled by said circuit, a signal receiver connected to said circuit for superimposing remote signals thereon; a signal transmitter remote from said body, a progressively variable control device connected to said transmitter for modifying signals produced by said transmitter as a function of the rate of displacement of said control device whereby attitude changes of the mobile body are controlled in proportion to the rate of displacement of said control device; and circuit means provided by said signal receiver for excluding remote signals from said control circuit when said control device assumes a neutral position.

3. A control system comprising a mobile body carrying a gyrostabilizer, a control circuit including a progressively variable element connected to said gyrostabilizer, an attitude varying mechanism controlled by said circuit, a signal receiver connected to said circuit for superimposing remote signals thereon; a signal transmitter remote from said body, a progressively variable control device connected to said transmitter for modifying signals produced by said transmitter as a function of the rate and magnitude of displacement of said control device from a neutral position whereby attitude changes of the mobile body are controlled in proportion to the rate and magnitude of displacement of said control device from its neutral position; and circuit means provided by said signal receiver for excluding remote signals from said control circuit when said control device assumes its neutral position.

4. A control system comprising a mobile body carrying a gyrostabilizer, a control circuit including a progressively variable element connected to said gyrostabilizer, a plurality of attitude varying mechanisms controlled by said circuit, a signal receiver connected to said circuit for superimposing remote signals thereon; a signal transmitter remote from said body, a plurality of progressively variable control devices connected to said transmitter for modifying signals produced by said transmitter as a function of the magnitude of displacement of said control devices from neutral positions whereby attitude changes of the mobile body are controlled in proportion to the magnitude of displacement of said control devices from said neutral positions; and circuit means provided by said signal receiver for excluding remote signals from said control circuit when said control devices assume said neutral positions.

References Cited in the file of this patent

UNITED STATES PATENTS

| | | |
|---|---|---|
| 2,393,892 | De Ganahl | Jan. 29, 1946 |
| 2,612,331 | Frazier et al. | Sept. 30, 1952 |